US012729285B2

(12) United States Patent
Miyazaki

(10) Patent No.: US 12,729,285 B2
(45) Date of Patent: Sep. 8, 2026

(54) RUBBER COMPOSITION AND PNEUMATIC TIRE USING SAME

(71) Applicant: Toyo Tire Corporation, Itami (JP)

(72) Inventor: Hironori Miyazaki, Itami (JP)

(73) Assignee: Toyo Tire Corporation, Itami (JP)

( * ) Notice: Subject to any disclaimer, the term of this patent is extended or adjusted under 35 U.S.C. 154(b) by 562 days.

(21) Appl. No.: 18/119,072

(22) Filed: Mar. 8, 2023

(65) Prior Publication Data

US 2023/0303802 A1 Sep. 28, 2023

(30) Foreign Application Priority Data

Mar. 28, 2022 (JP) ................................ 2022-052459

(51) Int. Cl.
*C08K 5/36* (2006.01)
*B60C 1/00* (2006.01)

(52) U.S. Cl.
CPC ............. *C08K 5/36* (2013.01); *B60C 1/0041* (2013.01)

(58) Field of Classification Search
CPC ... C08K 5/36; C08K 3/04; C08K 3/06; C08K 5/0025; C08K 5/09; C08K 2003/2296; C08K 5/44; B60C 1/0041; B60C 1/00
See application file for complete search history.

(56) References Cited

U.S. PATENT DOCUMENTS 4,740,559 A 4/1988 Johansson et al.

FOREIGN PATENT DOCUMENTS

| | | | |
|---|---|---|---|
| JP | S62-84133 | A | 4/1987 |
| JP | 2005-507966 | A | 3/2005 |
| JP | 2017-517603 | A | 6/2017 |
| JP | 2019-19310 | A | 2/2019 |
| JP | 2021-105155 | A | 7/2021 |
| WO | 03/037974 | A2 | 5/2003 |
| WO | 03/037974 | A3 | 5/2003 |
| WO | 2015/123552 | A1 | 8/2015 |

OTHER PUBLICATIONS

Wreczycki (J. Wreczycki, et al, Sulfur/organic copolymers as curing agents for rubber, Polymers, 2018, 10, 870, pp. 1-20).*
Wu (X. Wu, et al, Catalytic Inverse Vulcanization, Nature Communications, 2019, pp. 1-9 and supplementary Information).*
Office Action dated Jun. 2, 2026, issued in counterpart JP Application No. 2022-175668, with English translation. (8 pages).

* cited by examiner

*Primary Examiner* — Kumar R Bhushan
(74) *Attorney, Agent, or Firm* — WHDA, LLP

(57) ABSTRACT

Provided is a rubber composition having excellent breaking strength. The rubber composition contains an inverse vulcanizate having a glass transition temperature of 60° C. or lower.

20 Claims, No Drawings

RUBBER COMPOSITION AND PNEUMATIC TIRE USING SAME

BACKGROUND OF THE INVENTION

1. Field of the Invention

The present invention relates to a rubber composition and a pneumatic tire using the same.

2. Description of Related Art

A rubber composition is required to have improved breaking strength in order to improve durability.

In order to solve such a problem, JP2005-507966A describes a rubber composition containing a sulfur-containing polymer as a rubber composition having excellent abrasion resistance. JP2019-19310A describes a rubber composition containing a sulfur-containing oligomer as a rubber composition having excellent chipping resistance (elongation at break). However, there is room for improvement in breaking strength.

SUMMARY OF THE INVENTION

In view of the above, an object of the invention is to provide a rubber composition having excellent breaking strength.

Note that the rubber compositions described in JP2005-507966A and JP2019-19310A do not contain an inverse vulcanizate. JP2017-517603A describes an inverse vulcanizate, but does not describe compounding the inverse vulcanizate as a vulcanization agent in a rubber composition.

A rubber composition according to the invention contains an inverse vulcanizate having a glass transition point of 60° C. or lower.

A content of sulfur in the inverse vulcanizate may be 30 mass % to 90 mass %.

The above inverse vulcanizate may be obtained by reacting sulfur and an organic compound containing a hydrocarbon having two or more unsaturated bonds.

The above inverse vulcanizate may be obtained by reacting limonene and sulfur, by reacting dicyclopentadiene and sulfur, or by reacting limonene, dicyclopentadiene, and sulfur.

A pneumatic tire according to the invention is produced using the above rubber composition.

According to the rubber composition of the invention, excellent breaking strength can be obtained.

DESCRIPTION OF EMBODIMENTS

Hereinafter, matters related to embodiments of the invention will be described in detail.

A rubber composition according to the present embodiment contains an inverse vulcanizate having a glass transition point of 60° C. or lower. Here, in the present specification, the term "inverse vulcanizate" refers to a substance having a structure in which chain sulfur is crosslinked with a small amount of an organic substance, and is different from a substance in which polymer chains of an organic substance are crosslinked with a small amount of sulfur, which is obtained by normal vulcanization. The term "glass transition point" is a value measured at a temperature rise rate of 20° C./min (measurement temperature range: −100° C. to 150° C.) by a differential scanning calorimetry (DSC) method in accordance with JIS K7121.

The rubber composition according to the present embodiment preferably contains a diene rubber as a rubber component. The diene rubber may be, for example, a natural rubber (NR), a synthetic isoprene rubber (IR), a butadiene rubber (BR), a styrene-butadiene rubber (SBR), a nitrile rubber (NBR), a chloroprene rubber (CR), a butyl rubber (IIR), a styrene-isoprene copolymer rubber, a butadiene-isoprene copolymer rubber, and a styrene-isoprene-butadiene copolymer rubber.

The glass transition point of the inverse vulcanizate is 60° C. or lower, preferably 50° C. or lower, and more preferably 45° C. or lower. In addition, the glass transition point is preferably −50° C. or higher, more preferably −20° C. or higher, still more preferably −10° C. or higher, and particularly preferably 0° C. or higher. When the inverse vulcanizate having a glass transition point of 60° C. or lower is used, the inverse vulcanizate is melted when mixed with the rubber composition, and is easily uniformly dispersed in the rubber composition. As a result, a crosslinked structure is uniformly formed in the rubber composition, and excellent breaking strength is easily obtained. Note that a melting point of sulfur used in normal vulcanization is 112.8° C., which is higher than a temperature at the time of mixing with the rubber composition, and thus it is more difficult to uniformly disperse the sulfur than the inverse vulcanizate.

The inverse vulcanizate is preferably in a solid state at a normal temperature of 23° C. When the inverse vulcanizate is in a solid state, it is easy to handle the inverse vulcanizate in the case of preparing the rubber composition. Here, the term "solid state" refers to a state in which the inverse vulcanizate does not have fluidity at a normal temperature of 23° C.

As shown in the following reaction formula, the inverse vulcanizate is preferably obtained by reacting sulfur and an organic compound containing a hydrocarbon having two or more unsaturated bonds. Specifically, cyclic sulfur is heated at 159° C. or higher to convert into linear sulfur. Then, the linear sulfur and the organic compound containing a hydrocarbon having two or more unsaturated bonds are mixed and reacted, and thus the inverse vulcanizate is obtained. A temperature condition for mixing the linear sulfur and the organic compound is preferably 100° C. or higher, more preferably 120° C. or higher, and still more preferably 140° C. or higher. Note that a catalyst such as a base or a metal salt may be used as necessary.

[Chem. 1]

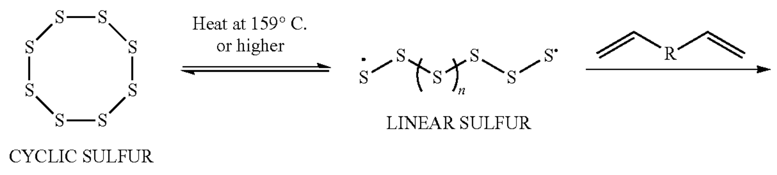

-continued

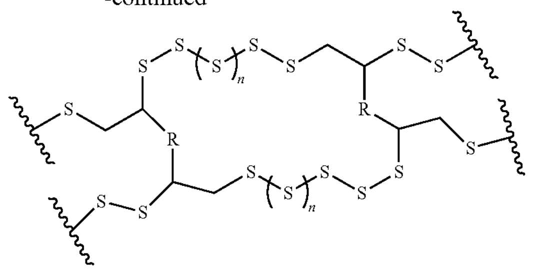

INVERSE VULCANIZATE

The organic compound containing a hydrocarbon having two or more unsaturated bonds may be one having heteroatoms such as oxygen atoms, nitrogen atoms, sulfur atoms, or silicon atoms, but is preferably one having no heteroatom. That is, the organic compound is preferably composed of carbon and hydrogen. A boiling point of the organic compound is preferably 80° C. or higher, more preferably 100° C. or higher, and still more preferably 120° C. or higher. A molecular weight of such an organic compound is not particularly limited, and is preferably 100 to 3,000, more preferably 100 to 500, and still more preferably 100 to 300. Examples of such an organic compound include limonene, terpinolene, dicyclopentadiene (DCPD), diisopropenylbenzene (DIB), divinylbenzene (DVB), ethylene glycol dimethylacrylate (EGDMA), 1,5,9-cyclododecatriene (CDDT), 5-vinyl 2-norbornene (VNB), 1,2,4-trivinylhexane (TVCH), tetraallyloxyethane, squalene, 2,4,6,8-tetramethyl-2,4,6,8-tetravinylcyclotetrasiloxane, and 4-aminostyrene. Among these, limonene and dicyclopentadiene are preferred. That is, the inverse vulcanizate is more preferably obtained by reacting limonene and sulfur, by reacting dicyclopentadiene and sulfur, or by reacting limonene, dicyclopentadiene, and sulfur.

A compounding ratio (organic compound/sulfur) of the organic compound containing a hydrocarbon having two or more unsaturated bonds to the sulfur is not particularly limited, and is preferably 0.1 to 2.5, and more preferably 0.25 to 1 in terms of mass ratio. When the compounding ratio is within the above range, the inverse vulcanizate having a glass transition point temperature of 60° C. or lower is easily obtained.

In a preferred embodiment, a compounding ratio (dicyclopentadiene/sulfur) of the dicyclopentadiene to the sulfur is not particularly limited, and is preferably 0 to 0.5, and more preferably 0.01 to 0.4 in terms of mass ratio. When the compounding ratio is within the above range, the inverse vulcanizate having a glass transition point temperature of 60° C. or lower is easily obtained.

In a preferred embodiment, a compounding ratio (limonene/sulfur) of the limonene to the sulfur is not particularly limited, and is preferably 0 to 4, and more preferably 0.1 to 2.5 in terms of mass ratio. When the compounding ratio is within the above range, the inverse vulcanizate having a glass transition point temperature of 60° C. or lower is easily obtained.

In a preferred embodiment, a compounding ratio (dicyclopentadiene/limonene) of the dicyclopentadiene to the limonene is not particularly limited, and is preferably 0 to 1.5, and more preferably 0.01 to 1 in terms of mass ratio. When the compounding ratio is within the above range, the inverse vulcanizate having a glass transition point temperature of 60° C. or lower is easily obtained.

In the inverse vulcanizate, sulfur chains are split during vulcanization, and a crosslinked structure containing carbon chains is bonded to polymer chains of a rubber component to form a crosslinked structure. By forming the crosslinked structure containing carbon chains as the crosslinked structure, a crosslinked chain is longer than that of a crosslinked structure composed of only sulfur, which is obtained by normal vulcanization. As a result, flexibility and breaking strength of the rubber are improved. Furthermore, when the rubber composition according to the present embodiment is stored as an unvulcanized rubber, the inverse vulcanizate is a polymer, and thus has lower migration properties and is less likely to bleed out than sulfur.

A content ratio of the sulfur in the inverse vulcanizate is preferably 30 mass % to 90 mass %, more preferably 40 mass % to 85 mass %, and still more preferably 50 mass % to 80 mass %.

A content of the inverse vulcanizate is preferably 0.1 parts by mass to 20 parts by mass, more preferably 0.1 parts by mass to 15 parts by mass, and still more preferably 0.1 parts by mass to 10 parts by mass, with respect to 100 parts by mass of the diene rubber. The content in terms of sulfur is preferably 0.05 parts by mass to 16 parts by mass, more preferably 0.05 parts by mass to 12 parts by mass, and still more preferably 0.05 parts by mass to 8 parts by mass, with respect to 100 parts by mass of the diene rubber.

Carbon black and/or silica are preferably used as a reinforcing filler. That is, the reinforcing filler may be carbon black alone, silica alone, or a combination of carbon black and silica. The reinforcing filler is preferably carbon black alone or a combination of carbon black and silica. A content of the reinforcing filler is not particularly limited, and is, for example, preferably 10 parts by mass to 140 parts by mass, more preferably 20 parts by mass to 100 parts by mass, and still more preferably 20 parts by mass to 80 parts by mass, with respect to 100 parts by mass of the diene rubber.

The above carbon black is not particularly limited, and various known kinds of products can be used. A content of the carbon black is preferably 5 parts by mass to 100 parts by mass, and more preferably 20 parts by mass to 80 parts by mass, with respect to 100 parts by mass of the diene rubber.

The silica is also not particularly limited, and wet silica such as silica made by a wet-type precipitation method or silica made by a wet-type gel method is preferably used. When the silica is compounded, a content thereof is preferably 5 parts by mass to 40 parts by mass, and more preferably 5 parts by mass to 30 parts by mass, with respect to 100 parts by mass of the diene rubber.

In addition to the components described above, various additives generally used in the rubber composition, such as a silane coupling agent, zinc oxide, stearic acid, an antioxidant, a wax, an oil, a vulcanization agent, and a vulcanization accelerator, can be compounded in the rubber composition according to the present embodiment.

As the vulcanization agent, sulfur may be compounded in addition to the above inverse vulcanizate. When the inverse vulcanizate and the sulfur are used in combination, a content of the vulcanization agent (total amount of the inverse vulcanizate and the sulfur) is not particularly limited, and is preferably 0.1 parts by mass to 20 parts by mass, and more preferably 0.5 parts by mass to 10 parts by mass, with respect to 100 parts by mass of the rubber component. Examples of the vulcanization accelerator include various vulcanization accelerators such as sulfenamide-based, thiuram-based, thiazole-based, and guanidine-based vulcanization accelerators, which may be used alone or in combination of two or more kinds thereof. A content of the vulcanization accelerator is not particularly limited, and is preferably 0.1 parts by mass to 7 parts by mass, and more preferably 0.5 parts by mass to 5 parts by mass, with respect to 100 parts by mass of the rubber component.

The rubber composition according to the present embodiment can be produced by kneading according to a common method by using a mixer such as a Banbury mixer, a kneader, or a roll that is normally used. That is, for example, in a first mixing stage, additives excluding the vulcanization agent (including the inverse vulcanizate) and the vulcanization accelerator are added to and mixed with the diene rubber, and then in a final mixing stage, the vulcanization agent (including the inverse vulcanizate) and the vulcanization accelerator are added to and mixed with the obtained mixture to prepare a rubber composition.

The rubber composition obtained in this way can be applied to pneumatic tires of various applications and various sizes, such as a tire for a passenger vehicle or a large tire of a truck or a bus. That is, the rubber composition is molded into a predetermined shape by a common method, for example, extrusion processing, combined with other parts to produce a green tire, and then the green tire is subjected to vulcanization molding at, for example, 140° C. to 180° C., and thus the pneumatic tire can be produced.

EXAMPLES

Hereinafter, Examples of the invention will be illustrated, but the invention is not limited to these Examples.

Synthesis Example A

To a glass container, 2.5 g of sulfur was added and stirred at 165° C. for 15 minutes. After it was confirmed that the sulfur was dissolved, 2.5 g of dicyclopentadiene was added, and the mixture was further stirred at 165° C. for 30 minutes. After it was confirmed that a color of the solution was changed, the solution was poured into a silicon mold. Thereafter, the solution was heated in an oven at 140° C. for 16 hours to obtain an inverse vulcanizate A. A glass transition point of the obtained inverse vulcanizate A was measured and found to be 97° C. When elemental analysis was performed, a sulfur content was 65 mass %.

Synthesis Example B

To a glass container, 2.5 g of sulfur was added and stirred at 165° C. for 15 minutes. After it was confirmed that the sulfur was dissolved, 1.5 g of dicyclopentadiene and 1.0 g of limonene were added, and the mixture was further stirred at 165° C. for 30 minutes. After it was confirmed that a color of the solution was changed, the solution was poured into a silicon mold. Thereafter, the solution was heated in an oven at 140° C. for 16 hours to obtain an inverse vulcanizate B. A glass transition point of the obtained inverse vulcanizate B was measured and found to be 70° C. When elemental analysis was performed, a sulfur content was 67 mass %.

Synthesis Example C

To a glass container, 1.5 g of sulfur was added and stirred at 165° C. for 15 minutes. After it was confirmed that the sulfur was dissolved, 0.5 g of dicyclopentadiene and 3.0 g of limonene were added, and the mixture was further stirred at 165° C. for 30 minutes. After it was confirmed that a color of the solution was changed, the solution was poured into a silicon mold. Thereafter, the solution was heated in an oven at 140° C. for 16 hours to obtain an inverse vulcanizate C. A glass transition point of the obtained inverse vulcanizate C was measured and found to be 41° C. When elemental analysis was performed, a sulfur content was 56 mass %.

Synthesis Example D

To a glass container, 2.5 g of sulfur was added and stirred at 165° C. for 15 minutes. After it was confirmed that the sulfur was dissolved, 0.5 g of dicyclopentadiene and 2.0 g of limonene were added, and the mixture was further stirred at 165° C. for 30 minutes. After it was confirmed that a color of the solution was changed, the solution was poured into a silicon mold. Thereafter, the solution was heated in an oven at 140° C. for 16 hours to obtain an inverse vulcanizate D. A glass transition point of the obtained inverse vulcanizate D was measured and found to be 29° C. When elemental analysis was performed, a sulfur content was 66 mass %.

Synthesis Example E

To a glass container, 3.5 g of sulfur was added and stirred at 165° C. for 15 minutes. After it was confirmed that the sulfur was dissolved, 0.5 g of dicyclopentadiene and 1.0 g of limonene were added, and the mixture was further stirred at 165° C. for 30 minutes. After it was confirmed that a color of the solution was changed, the solution was poured into a silicon mold. Thereafter, the solution was heated in an oven at 140° C. for 16 hours to obtain an inverse vulcanizate E. A glass transition point of the obtained inverse vulcanizate E was measured and found to be 19° C. When elemental analysis was performed, a sulfur content was 76 mass %.

Synthesis Example F

To a glass container, 4.0 g of sulfur was added and stirred at 165° C. for 15 minutes. After it was confirmed that the sulfur was dissolved, 0.5 g of dicyclopentadiene and 0.5 g of limonene were added, and the mixture was further stirred at 165° C. for 30 minutes. After it was confirmed that a color of the solution was changed, the solution was poured into a silicon mold. Thereafter, the solution was heated in an oven at 140° C. for 16 hours to obtain an inverse vulcanizate F. A glass transition point of the obtained inverse vulcanizate F was measured and found to be 17° C. When elemental analysis was performed, a sulfur content was 84 mass %.

Synthesis Example G

To a glass container, 2.5 g of sulfur was added and stirred at 165° C. for 15 minutes. After it was confirmed that the sulfur was dissolved, 2.5 g of limonene was added, and the mixture was further stirred at 165° C. for 30 minutes. After it was confirmed that a color of the solution was changed, the solution was poured into a silicon mold. Thereafter, the solution was heated in an oven at 140° C. for 16 hours to obtain an inverse vulcanizate G. A glass transition point of the obtained inverse vulcanizate G was measured and found to be 5° C. When elemental analysis was performed, a sulfur content was 65 mass %.

First, compounding agents excluding a vulcanization agent and a vulcanization accelerator were added to a diene rubber component in a first mixing stage in accordance with compounding (part by mass) illustrated in Table 1 below by using an internal mixer and kneading was performed (discharge temperature=160° C.). Next, the vulcanization agent and the vulcanization accelerator were added to the obtained kneaded material in a final mixing stage and kneading was performed (discharge temperature=90° C.) to produce a rubber composition. Details of each component in Table 1 are as follows.

SBR: "SBR1502" manufactured by JSR Corporation

NR: RSS #3

Carbon black: "Show Black N330T" manufactured by Cabot Japan Corporation

Zinc oxide: "Zinc Oxide No. 3" manufactured by Mitsui Mining & Smelting Co., Ltd.

Stearic acid: "LUNAC S-20" manufactured by Kao Corporation

Sulfur: "Powdered sulfur" manufactured by Tsurumi Chemical Industry Co., ltd., sulfur content=95 mass %

Crosslinking agent: bis[N,N-di(benzyl)trithioperoxycarbamic acid]hexamethylene,

"KA9188" manufactured by LANXESS, sulfur content=28 mass %

Inverse vulcanizate A: inverse vulcanizate obtained in the above Synthesis Example A, Tg=95° C., sulfur content=65 mass %

Inverse vulcanizate B: inverse vulcanizate obtained in the above Synthesis Example B, Tg=70° C., sulfur content=67 mass %

Inverse vulcanizate C: inverse vulcanizate obtained in the above Synthesis Example C, Tg=41° C., sulfur content=56 mass %

Inverse vulcanizate D: inverse vulcanizate obtained in the above Synthesis Example D, Tg=29° C., sulfur content=66 mass %

Inverse vulcanizate E: inverse vulcanizate obtained in the above Synthesis Example E, Tg=19° C., sulfur content=76 mass %

Inverse vulcanizate F: inverse vulcanizate obtained in the above Synthesis Example F, Tg=17° C., sulfur content=84 mass %

Inverse vulcanizate G: inverse vulcanizate obtained in the above Synthesis Example G, Tg=5° C., sulfur content=65 mass %

Vulcanization accelerator: "NOCCELER CZ-G (CZ)" manufactured by Ouchi Shinko Chemical Industrial Co., Ltd.

Note that the glass transition point was measured at a temperature rise rate of 20° C./min (measurement temperature range: −100° C. to 150° C.) by a differential scanning calorimetry (DSC) method in accordance with JIS K7121. The sulfur content was measured by a combustion method using an organic element analyzer.

Each of the obtained rubber compositions was subjected to a tensile test according to the following method to evaluate breaking strength.

Tensile strength at break: a tensile test (dumbbell No. 7) in accordance with JIS K6251 was performed, and the tensile strength at break was measured. The index was shown for Comparative Examples 2 to 4 and Examples 1 to 7 with a value of Comparative Example 1 being 100, and the index was shown for Example 8 with a value of Comparative Example 5 being 100. The larger the index, the more excellent the breaking strength.

TABLE 1

| | Comp. Ex. 1 | Comp. Ex. 2 | Comp. Ex. 3 | Comp. Ex. 4 | Ex. 1 | Ex. 2 | Ex. 3 | Ex. 4 | Ex. 5 | Ex. 6 | Ex. 7 | Comp. Ex. 5 | Ex. 8 |
|---|---|---|---|---|---|---|---|---|---|---|---|---|---|
| SBR | 100 | 100 | 100 | 100 | 100 | 100 | 100 | 100 | 100 | 100 | 100 | — | — |
| NR | — | — | — | — | — | — | — | — | — | — | — | 100 | 100 |
| Carbon black | 30 | 30 | 30 | 30 | 30 | 30 | 30 | 30 | 30 | 30 | 30 | 30 | 30 |
| Zinc oxide | 2 | 2 | 2 | 2 | 2 | 2 | 2 | 2 | 2 | 2 | 2 | 2 | 2 |
| Stearic acid | 1 | 1 | 1 | 1 | 1 | 1 | 1 | 1 | 1 | 1 | 1 | 1 | 1 |
| Sulfur | 2.5 | — | — | — | — | — | 1 | 2 | — | — | — | 2.5 | — |
| Crosslinking agent | — | 12 | — | — | — | — | — | — | — | — | — | — | — |
| Inverse vulcanizate A | — | — | 5 | — | — | — | — | — | — | — | — | — | — |
| Inverse vulcanizate B | — | — | — | 5 | — | — | — | — | — | — | — | — | — |
| Inverse vulcanizate C | — | — | — | — | 8.3 | — | — | — | — | — | — | — | — |
| Inverse vulcanizate D | — | — | — | — | — | 5 | 3 | 1 | — | — | — | — | — |
| Inverse vulcanizate E | — | — | — | — | — | — | — | — | 3.6 | — | — | — | — |
| Inverse vulcanizate F | — | — | — | — | — | — | — | — | — | 3.1 | — | — | 3.1 |
| Inverse vulcanizate G | — | — | — | — | — | — | — | 1 | — | — | 5 | — | — |
| Vulcanization accelerator | 1 | 1 | 1 | 1 | 1 | 1 | 1 | 1 | 1 | 1 | 1 | 1 | 1 |
| Tensile strength at break | 100 | 91 | 7 | 41 | 138 | 135 | 120 | 118 | 131 | 120 | 122 | 100 | 102 |

Results are illustrated in Table 1. In Examples 1 to 7, the breaking strength is more excellent than that in Comparative Example 1. In Example 8, the breaking strength is more excellent than that in Comparative Example 5.

Comparative Example 2 is an example in which a vulcanization agent which is not an inverse vulcanizate is used, and the breaking strength is inferior to that in Comparative Example 1.

Comparative Examples 3 and 4 are examples in which a glass transition point of the inverse vulcanizate exceeds an upper limit value, and the breaking strength is inferior to that in Comparative Example 1.

The rubber composition according to the invention can be used for various rubber compositions for tires of, for example, passenger vehicles, light trucks, and buses.

What is claimed is:

1. A rubber composition comprising: a diene rubber; and an inverse vulcanizate having a glass transition point of 0 °C or higher and 60 °C or lower, wherein the inverse vulcanizate is contained in an amount of 0.1 parts by mass to 20 parts by mass with respect to 100 parts by mass of the diene rubber.

2. The rubber composition according to claim 1, wherein a content of sulfur in the inverse vulcanizate is 30 mass % to 90 mass %.

3. The rubber composition according to claim 1, wherein the inverse vulcanizate is obtained by reacting sulfur and an organic compound containing a hydrocarbon having two or more unsaturated bonds.

4. The rubber composition according to claim 2, wherein the inverse vulcanizate is obtained by reacting sulfur and an organic compound containing a hydrocarbon having two or more unsaturated bonds.

5. The rubber composition according to claim 1, wherein the inverse vulcanizate is obtained by reacting limonene and sulfur, by reacting dicyclopentadiene and sulfur, or by reacting limonene, dicyclopentadiene, and sulfur.

6. The rubber composition according to claim 2, wherein the inverse vulcanizate is obtained by reacting limonene and sulfur, by reacting dicyclopentadiene and sulfur, or by reacting limonene, dicyclopentadiene, and sulfur.

7. The rubber composition according to claim 3, wherein the inverse vulcanizate is obtained by reacting limonene and sulfur, by reacting dicyclopentadiene and sulfur, or by reacting limonene, dicyclopentadiene, and sulfur.

8. The rubber composition according to claim 4, wherein the inverse vulcanizate is obtained by reacting limonene and sulfur, by reacting dicyclopentadiene and sulfur, or by reacting limonene, dicyclopentadiene, and sulfur.

9. A pneumatic tire produced using the rubber composition according to claim 1.

10. A pneumatic tire produced using the rubber composition according to claim 2.

11. A pneumatic tire produced using the rubber composition according to claim 3.

12. A pneumatic tire produced using the rubber composition according to claim 4.

13. A pneumatic tire produced using the rubber composition according to claim 5.

14. A pneumatic tire produced using the rubber composition according to claim 6.

15. A pneumatic tire produced using the rubber composition according to claim 7.

16. A pneumatic tire produced using the rubber composition according to claim 8.

17. The rubber composition according to claim 1, wherein a content of sulfur in the inverse vulcanizate is 50 mass % to 85 mass %, and the inverse vulcanizate is obtained by reacting linear sulfur and an organic compound containing a hydrocarbon having two or more unsaturated bonds.

18. The rubber composition according to claim 17, wherein mass ratio of the organic compound containing a hydrocarbon having two or more unsaturated bonds to the linear sulfur is 0.25 to 2.5.

19. A pneumatic tire produced using the rubber composition according to claim 17.

20. A pneumatic tire produced using the rubber composition according to claim 18.

* * * * *